F. REDDAWAY AND G. J. RACKHAM.
TIRE AND WHEEL RIM TO BE USED THEREWITH.
APPLICATION FILED MAR. 22, 1921.
1,408,399.
Patented Feb. 28, 1922.
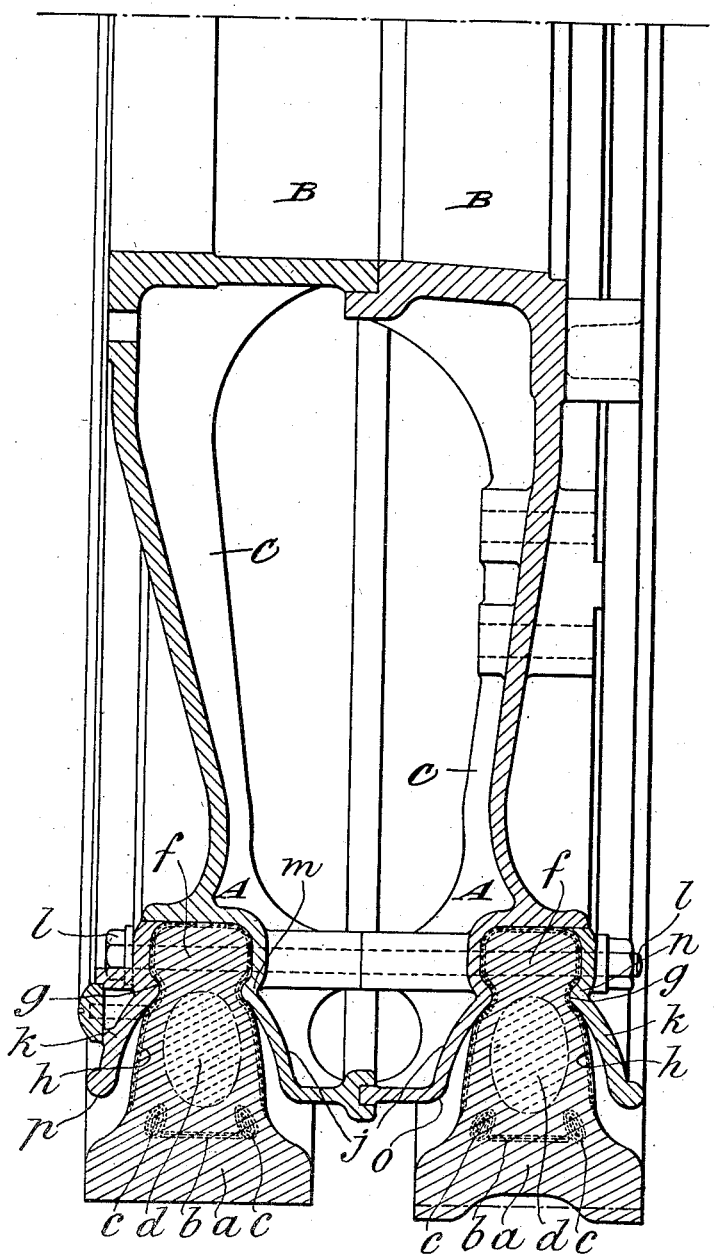
Inventors:-
F. Reddaway + G. J. Rackham
By their Attorneys,

UNITED STATES PATENT OFFICE.

FRANK REDDAWAY AND GEORGE JOHN RACKHAM, OF LONDON, ENGLAND.

TIRE AND WHEEL RIM TO BE USED THEREWITH.

1,408,399. Specification of Letters Patent. Patented Feb. 28, 1922.

Application filed March 22, 1921. Serial No. 454,469.

*To all whom it may concern:*

Be it known that we, FRANK REDDAWAY, a subject of the King of Great Britain, residing at 50 and 51 Lime Street, London, England, and GEORGE JOHN RACKHAM, a subject of the King of Great Britain, residing at 146 Upper Richmond Road, Putney, London, England, have invented new and useful Improvements in Tires and Wheel Rims to be Used Therewith, of which the following is a specification.

This invention relates to improvements in tires and in wheel rims to be used therewith. According to this invention, the tire comprises a hard rubber body having a soft rubber resilient core embedded in it in a novel way. That part of the tire forming the tread is of hard rubber, that part of the tire containing the soft rubber core is of less width than the tread, and has a greater depth than width and may be reinforced by cords or canvas at the sides. That part of the tire which is secured to the rim is of hard rubber and has a groove on each side to facilitate in securing the tire to the rim.

Preferably the tread is of rectangular section and the tread is reinforced at is base by canvas and cords; canvas passes round the inmost part of the tire and extends over the sides of the resilient part of the tire.

The adjacent surfaces of the three parts of of the tire merge with one another in order that no definite line of cleavage may be formed.

The rim may have one fixed and one detachable flange which flanges are formed to surround the inmost part of the tire and have projections which enter the grooves between the inmost and the resilient portions. The distance between the flanges increases outwards and is greater than the width of the resilient part when uncompressed so that the extent of the distortion of the resilient part may be controlled by the flanges when the tire is compressed. The flanges may have rounded edges which engage with the inner part of the rectangular tread when the tire is sufficiently compressed.

The annexed drawing is a section of a wheel having twin tires held in rims, both the tires and rims being made in accordance with this invention. The rims of the wheel are indicated at A, the hubs at B, and the spokes or parts connecting the hubs and rims at C.

Each tire has:—

(1) a tread $a$ of rectangular section made of hard rubber reinforced by canvas $b$ and cords $c, c$.

(2) A resilient portion $d$ of less width than the tread $a$ and of a depth greater than its width made of soft rubber.

(3) A portion $f$ of hard rubber so secured to the portion $d$ as to leave a groove $g$ on each side of the tire. A portion of hard rubber of the portion $f$ extends on each side of the resilient portion $d$ to the tread $a$ and canvas $h$ passes round the portion $f$ and extends over the sides of the resilient portion $d$.

Each rim has a fixed inner flange $j$ and a detachable outer flange $k$, the flanges $k$ being secured to the rims by bolts $l$. The flanges $j$ and $k$ are formed to surround the portion $f$ and have projections $m$ and $n$ which enter the grooves $g$ and the distance between the flanges $j$ and $k$ outward of the projections is greater than the width of the resilient portion $d$. The flanges $j$ and $k$ have rounded edges $o$ and $p$ which engage with the tread $a$ and the extent of the distortion of the resilient portion is controlled by the flanges.

The drawings show two forms of tires, the tire on the left-hand side of the drawing having a plain flat periphery, while the tire on the right-hand side is formed with an annular circumferential recess.

What we claim is:—

1. A tire having a rubber tread portion of rectangular section, a hard rubber inner portion having a groove on each side, and a soft rubber core embedded in the tire which is of less width than the tread and is of a depth greater than its width.

2. A tire having a hard rubber tread portion of rectangular section reinforced by canvas and cords at its base, a hard rubber inner portion having a groove on each side, and a soft rubber core embedded in the tire which is of less width than the tread and is of a depth greater than its width.

3. A tire having a hard rubber tread portion of rectangular section reinforced by canvas and by cords at its base, a resilient core of soft rubber of less width than the tread and of greater depth than its width, and an inner portion of hard rubber having a groove on each side, a part of the hard rubber of the inner portion being extended on each side of the resilient core to the tread portion.

4. A tire having a portion of hard rubber forming a tread of rectangular section reinforced by canvas and by cords at its base, a resilient portion of soft rubber of less width than the tread and of a depth greater than its width, and an inner portion of hard rubber having a groove on each side, a portion of the hard rubber of the inner portion being extended on each side of the resilient portion to the tread, and a canvas covering which extends around the last mentioned portion and extends over the sides of the resilient portion.

5. A tire having a portion of hard rubber forming the tread, a resilient portion of soft rubber of less width than the tread, and of greater depth than its width, and an inner portion of hard rubber having a groove on each side combined with a rim having flanges surrounding the innermost portion of the tire, and having projections entering the grooves of the tire.

6. A tire having a portion of hard rubber forming the tread, a resilient portion of soft rubber of less width than the tread and of a depth greater than its width, and an inner portion of hard rubber having a groove on each side combined with a rim having flanges surounding the innermost portion of the tire and having projections entering the grooves therein, the distance between the flanges being greater than the width of the resilient portion and increasing outwards.

In testimony that we claim the foregoing as our invention we have signed our names this eighth day of March 1921.

FRANK REDDAWAY.
GEORGE JOHN RACKHAM.